(12) United States Patent
Holenstein et al.

(10) Patent No.: US 7,864,986 B2
(45) Date of Patent: *Jan. 4, 2011

(54) OPTICAL MARK READING THAT USES A DISREGARD STATE AS PART OF AN UNAMBIGUOUS SYMBOLOGY OF MARKS TO FILL INTO RESPONSE BUBBLES

(75) Inventors: Bruce D. Holenstein, Media, PA (US); Owen C. Davison, Honeybrook, PA (US); Victor F. Berutti, Glenmore, PA (US); Paul J. Holenstein, Downingtown, PA (US)

(73) Assignee: Gravic, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/482,949

(22) Filed: Jun. 11, 2009

(65) Prior Publication Data

US 2009/0242639 A1 Oct. 1, 2009

Related U.S. Application Data

(63) Continuation of application No. 10/859,483, filed on Jun. 2, 2004, now Pat. No. 7,555,145.

(60) Provisional application No. 60/475,342, filed on Jun. 3, 2003.

(51) Int. Cl.
*G06K 9/00* (2006.01)
*G06K 9/48* (2006.01)
*G06K 9/46* (2006.01)
*G06K 7/10* (2006.01)
*G09B 7/00* (2006.01)

(52) U.S. Cl. .............. 382/113; 382/195; 382/200; 382/203; 434/343; 434/356; 434/358; 434/362; 235/454

(58) Field of Classification Search ............... 382/113, 382/195, 200, 203, 202; 235/454; 434/355, 434/362, 353, 358, 359, 356
See application file for complete search history.

(56) References Cited

U.S. PATENT DOCUMENTS

| | | | | |
|---|---|---|---|---|
| 3,858,180 | A * | 12/1974 | Spanjersberg | 382/192 |
| 4,937,439 | A | 6/1990 | Wanninger et al. | |
| 4,989,258 | A * | 1/1991 | Takahashi et al. | 382/226 |
| 5,102,341 | A | 4/1992 | Koslin | |
| 5,134,669 | A * | 7/1992 | Keogh et al. | 382/318 |
| 5,184,003 | A | 2/1993 | McMillin et al. | |
| 5,235,655 | A * | 8/1993 | Hikawa | 382/317 |
| 5,452,379 | A * | 9/1995 | Poor | 382/317 |
| 5,711,673 | A * | 1/1998 | Grundy, Jr. | 434/353 |
| 6,854,644 | B1 | 2/2005 | Bolton et al. | |

(Continued)

FOREIGN PATENT DOCUMENTS

JP 04255088 A * 9/1992

(Continued)

*Primary Examiner*—Brian Q Le
*Assistant Examiner*—Michael A Newman
(74) *Attorney, Agent, or Firm*—Panitch Schwarze Belisario & Nadel LLP

(57) ABSTRACT

Response bubbles on a scannable form are provided that allow a user to mark the bubbles in a manner that signifies that the user wishes to have a response disregarded.

3 Claims, 10 Drawing Sheets

KEY:

unfilled (state 1)

filled (state 2)

disregard (state 3)

U.S. PATENT DOCUMENTS 7,077,313 B2 * 7/2006 Chung et al. ................ 235/386
7,555,145 B2 * 6/2009 Holenstein et al. .......... 382/113

FOREIGN PATENT DOCUMENTS

| JP | 07013984 A | * | 1/1995 |
| WO | WO 03010704 A1 | * | 2/2003 |
| WO | 03010704 A1 | | 6/2003 |

* cited by examiner

Please enter your Social Security number

KEY:
| strongly disagree, | disagree, | neutral, | agree, | strongly agree, | no opinion |
|---|---|---|---|---|---|
|  |  |  |  |  |  |
Q1. I like carrots. ☐
Q2. Soda makes me sick. ☐
Q3. Candy is a fun thing to eat. ☐
Q4. I love working at my company. ☐
Q5. My office is too warm. ☐
Example alternate key (uses a different translation table):
| strongly disagree, | disagree, | neutral, | agree, | strongly agree, | no opinion |
|---|---|---|---|---|---|
|  |  |  |  |  |  |
Figure 2

Elongated Bubble Column
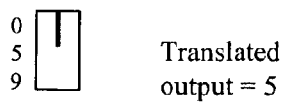 Translated output = 5
Figure 3
Mark Density
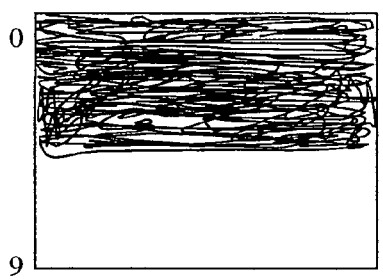
Figure 4a (50% filled)
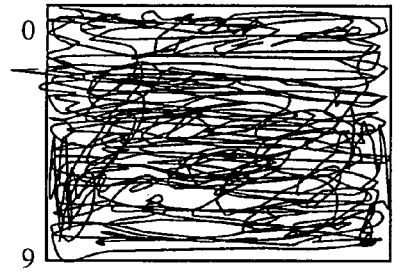
Figure 4b (also 50% filled, i.e. not fully blackened)
Position of line
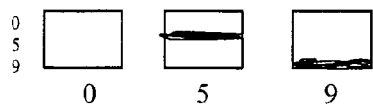
Figure 5a   Figure 5b   Figure 5c
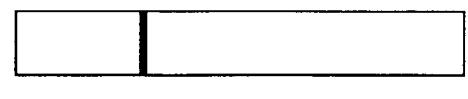
Figure 5d
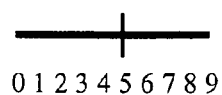
0 1 2 3 4 5 6 7 8 9
Figure 5e

Mark Angle
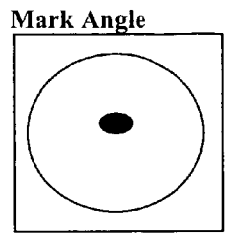
Figure 6a
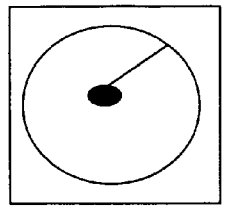
Figure 6b
Interpreted "angle" is translated into a number.
= 45
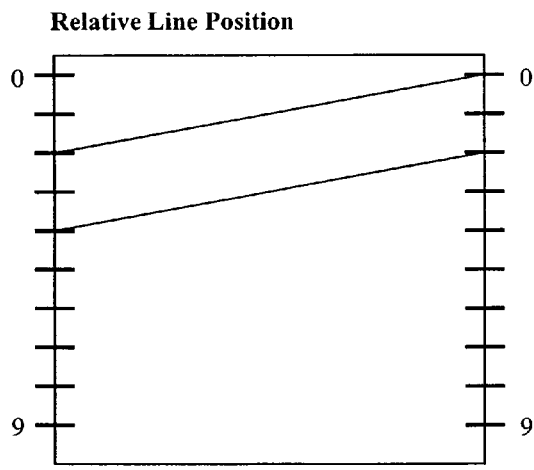
Figure 7  Difference
(both lines represent 2)
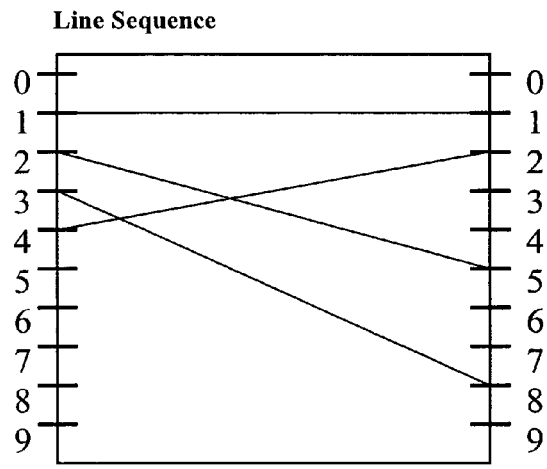
= 1582
Figure 8    Sequential
(each digit is represented by line starting on the left)

Adding Line Values

Center to Edge (or Just Edge)

Interpreted order direction

← Start position

Base 2 translated output
= 10110011

Mark Areas
| 0 | 1 | 2 | 3 | 4 |
|---|---|---|---|---|
| 5 | 6 | 7 | 8 | 9 |
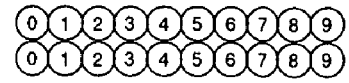
Figure 11a                                Figure 11b
Overlapping Marks (Shapes)
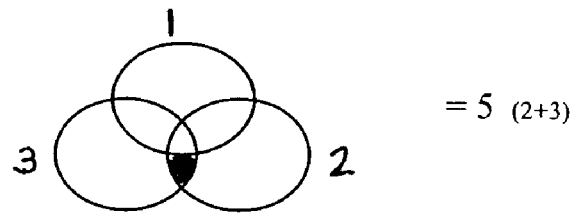
Figure 12
Disregard Scale
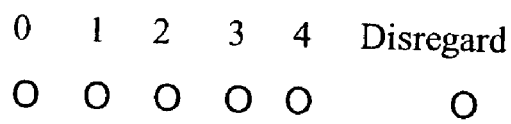
Figure 13

Up/Down

KEY:
unfilled (state 1)   filled (state 2)   disregard (state 3)
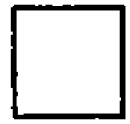      
Figure 16

Elongated Bubble Column with Disregard

Translated output = 5

Elongated Bubble Column with Disregard

Translated output = Disregard

Mark Areas with Disregard
| 0 | 1 | 2 | 3 | 4 | Disregard |
|---|---|---|---|---|---|
| 5 | 6 | 7 | 8 | 9 | |
Figure 18a – Note "Disregard" state option
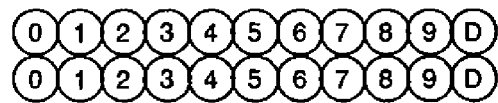
Figure 18b – Note "D" option to Disregard

OPTICAL MARK READING THAT USES A DISREGARD STATE AS PART OF AN UNAMBIGUOUS SYMBOLOGY OF MARKS TO FILL INTO RESPONSE BUBBLES

CROSS-REFERENCE TO RELATED APPLICATIONS

This application is a continuation of copending U.S. application Ser. No. 10/859,483 filed Jun. 2, 2004, the entire disclosure of which is incorporated herein by reference.

This application claims the benefit of U.S. Provisional Application No. 60/475,342 filed Jun. 3, 2003.

BACKGROUND OF THE INVENTION

1. Traditional OMR

Optical Mark Reading (OMR) is a technology that has been around for decades. A common application of OMR is in standardized testing. In these tests, respondents indicated their answer to a question by filling in, or marking, "bubbles" (response bubbles) or "marks" on a pre-printed form with a dark (number two) pencil. The interpreted binary raw scores of "filled" or "unfilled" must be fully translated in combination with additional bubbles into meaningful output results. For example, in the case of a survey or test, the individual bubbles may each correspond to the answers "A", "B", or "C", or the numbers "0" to "9". See, for example, FIG. 1a and FIG. 1b wherein the fourth and sixth bubbles are filled with the black dot symbol, respectively. The raw score is translated into the output values "D" and "5". FIG. 1c is an example of a nine-digit number bubble field.

OMR devices make the determination of whether or not a bubble (which can also take on other shapes, or which may even be an outline) is filled or unfilled by a user that makes a black dot symbol. Systems capable of processing these forms traditionally rely on expensive, dedicated hardware and require the purchase of expensive, pre-printed forms.

Traditional hardware-based OMR systems have been available for years from companies such as National Computer Systems (now called Pearson NCS) of Eden Prairie, Minn., and Scantron Corporation of Irvine, Calif. Such systems are disclosed, for example, in U.S. Pat. Nos. 5,184,003 (McMillin et al.); and 4,937,439 (Wanninger et al.). Traditional OMR systems typically rely on specially printed forms utilizing "drop-out" colors (i.e., colors that are not read by the reader), and dedicated scanning machines, called OMR readers. Forms typically have to be completed using a number two pencil or in some cases, a colored pen (e.g., blue or black).

OMR forms have a "timing track", made up of dark timing lines on the edge (or sometimes the top) of the page. These timing lines are detected by the reader as it moves the piece of paper (the form) past a read head. The read head contains a series of sensors (typically 48 across the page) that measure the amount of light returned from the page. Forms designed for OMR readers are often printed using special drop-out colors because they are readable by the human eye, but drop-out or disappear when scanned so as to not affect the output data. A number two pencil is used to mark the form because the pencil lead does not reflect the light back to the sensor. The special colors (like a light blue or red) drop-out colors reflect enough light back to the read sensors to be considered "unfilled". For example, the possible answers to a question might be "A", "B", "C", "D", and "E". These possible answers could be represented on the form by printing a series of bubbles with the corresponding letters within them. Both the bubbles and the letters could be printed using a drop-out color so that the OMR reader does not report that the bubbles are already filled.

When a timing line is found, the reader polls each of its sensors and creates a "read level" for each. Each sensor provides a read level value between 0 and the maximum, N. There is a value, T, between 0 and N which is deemed to be the recognition threshold. Usually, any sensors returning a value at or above (darker) the recognition threshold will be considered "filled" bubbles, and any below the threshold will be "unfilled". Even though the reader may be calculating read levels, the output of the OMR reader for each bubble will usually be correct because the difference in read levels is enough to eliminate all ambiguity that a user made the black dot symbol inside the bubble or not.

2. Software-Based OMR

Newer software-based OMR systems work with image scanners and easily created plain paper forms. Systems such as Remark Office OMR® by Principia Products, a division of Gravic, Inc., Malvern, Pa., use sophisticated software algorithms to eliminate the need for the timing lines on a form, thereby allowing the forms to be created with common office tools like a word processor and laser printer. However, existing software-based systems still produce one of two states for each of the bubbles on the page: "filled" or "unfilled". As in traditional OMR, the values are later translated into more complex data by the software algorithm, for example "A" to "Z" or "0" to "9" or "Jan" to "Dec", but the output of the reader used to interpret the bubbles is binary.

Software-based OMR systems use a self-registering algorithm wherein the bubbles that are to be recorded as either filled (or not) are in and of themselves used in a search algorithm to locate the bubbles on the page that are to be identified, thereby eliminating the need for the special paper and typical timing, framing, or other form registration marks that are found on the traditional OMR systems. Self-registering OMR means that the bubbles must be sufficiently well separated from each other and from the text and graphics on the form, thereby taking up precious additional space on the form.

To collect demographic data using traditional or software-based OMR system (such as a name or social security number) a very large field of bubbles has to be used. For example, to capture a social security number code using OMR, the form would typically include an array of nine rows of bubble fields (one each for "0" to "9"). The array size determines the maximum number of characters in the output number. Hence, for a nine digit number, 9×10 or 90 markable bubble areas are needed, as depicted in FIG. 1c.

The main value of traditional and software-based OMR systems is that they both have a very desirable accuracy approaching 99.9% or higher. This means that there is less than one error per one thousand bubbles on a page. Additionally, they are very fast, typically one page or more scanned per second. The speed and accuracy of OMR is a direct result of humans marking bubbles with an unambiguous symbol, the black dot, and the image processing algorithms then only having to discriminate between two choices.

3. Intelligent Character Recognition

Intelligent Character Recognition (ICR) systems of the type sold by Cardiff Software (now Verity, Inc.) of Sunnyvale, Calif. and others, in contrast, allow a person to fill in a bubble with a hand drawn letter or number symbols thus taking up little space on a form for each piece of data collected. (Some ICR systems even allow multiple characters to be drawn in each bubble.) The marks that a person makes in a bubble are directly interpreted as what was drawn, instead of being translated as in OMR. For example, a person draws a "9" and the output of the ICR system is an ASCII "9". The price of directly interpreting the bubbles and skipping a translation step which has limited choices is that the typical accuracy of ICR systems is from 95 to 98%, or several orders of magnitude less than OMR. For example, ICR systems have trouble interpreting and translating the symbols for "I" and "1" into the correct output. Thus, there might be dozens of errors that must be corrected on a typical form page. In typical form reading applications for surveys and tests, spelling checkers or context lookups (e.g., zip codes) are often not possible. Thus, the errors must be corrected by hand, thereby reducing the value of ICR software for forms reading. Additionally, ICR systems may take tens of seconds to minutes to directly interpret a single page of text and are considered slow compared to OMR systems.

There is an unmet need to have an automated system and method of collecting data from forms that yields the high accuracy and speeds that full translation of unambiguous symbols allows with OMR, uses easily created forms like software-based OMR readers do, and requires little real estate on the form like ICR allows thereby saving on paper and printing costs.

BRIEF SUMMARY OF THE INVENTION

The present invention, called "Multi-Level OMR," represents an automated system and method in which an unambiguous set of symbol marks are filled into bubbles, the marks are interpreted according to special algorithms, and are then translated into a limited set of output states which number more than two. (In contrast, conventional OMR provides only two output states.) However, direct interpretation of ambiguous symbols as with ICR into hundreds of states (i.e., all of the letters of the alphabet and numbers) is avoided. Specifically, a bubble may thus have more than two possible states: unfilled and n number of additional filled states depending upon the bubble type (shape, size, marking symbology, etc.), the methodology used to complete the bubble (pen, pencil, crayon, punch, etc.), the sequence applied to the bubble (part of a number, multiple choice, etc.), and the translation scale applied to the raw recognition score ("A" to "F", or "0" to "9", etc.). Thus, Multi-Level OMR allows the same information to be collected using a significantly smaller amount of space on the form than regular OMR. For example, using the example of entering a person's social security number in FIG. 1c, one embodiment of Multi-Level OMR uses a bubble field that contains only nine bubbles (one per possible digit in the code) instead of the 90 used in traditional OMR. Reducing the amount of form space required to collect data reduces the amount of paper used to collect data. Smaller form sizes reduce the cost of producing the forms and may increase the response rate of study participants. After practice, users may very well find that filling in a Multi-Level OMR bubble is easier, as it is more intuitive to have one bubble per question or letter. Multi-Level OMR enriches the data collection process by providing respondents with more ways to answer a question (makes the data more granular) and by providing researchers more precise data.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIGS. 1a-1c show portions of prior art response forms; and

FIGS. 2-18b show portions of response forms in accordance with preferred embodiments of the present invention.

DETAILED DESCRIPTION OF THE INVENTION

Figure 9:
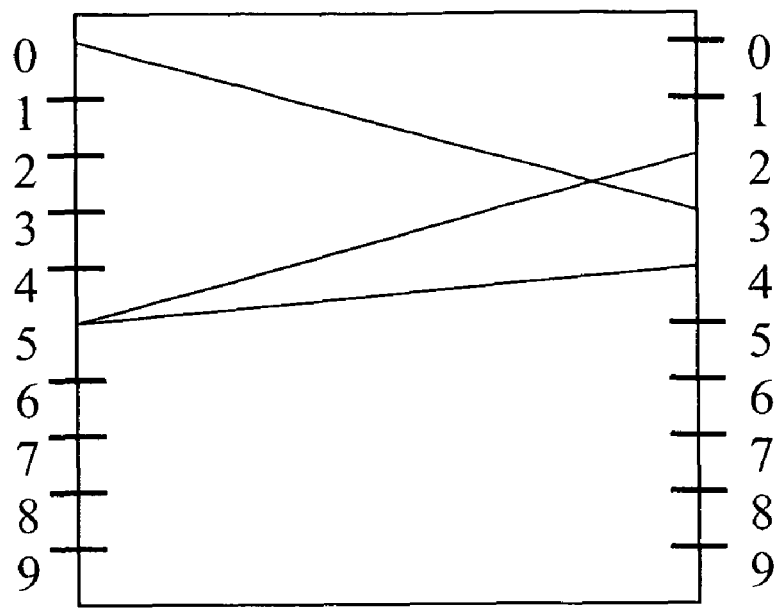

Certain terminology is used herein for convenience only and is not to be taken as a limitation on the present invention. In the drawings, the same reference letters are employed for designating the same elements throughout the several figures.

All of the Multi-Level OMR embodiments described below follow the same steps:

1. Pick an unambiguous symbology of marks to fill into a bubble design.

2. Design the form using that bubble shape. Have users fill out the form.

3. Recognize the filled in forms by doing the following:
   a. Search algorithms to find and isolate the bubbles on the image of the form page.
   b. Interpret the pixels associated with the bubble into a raw score(s) according to the symbology used to mark the bubble. The pixels associated with the bubble may be the pixels only inside of the bubble or may also include pixels around the periphery of the bubble.
   c. Translate the raw score into a limited number of possible states and output the results.

Symbology Choice

The ideal symbol set used for a particular form satisfies the following parameters:

1. There are enough different symbols that match the need for the particular survey question or test answer. Any extra symbols should be avoided to maintain the best accuracy.

2. The symbols to be marked should not be ambiguous. For example, in ICR, the letter "I" and the number "1" are ambiguous. Experimentation and practice may be needed to make a good symbol choice because users may be sloppy filling in forms. Marks which should be distinct are sometimes not drawn distinctly as in the case of the numbers "4" and "9". The ranges for symbologies that are continuous must be deliberately defined to be coarse-grained. Thus, if the symbology choice is the angle or length of a line, for example, a three-level symbology choice might be short lines at "0," "45," and "90" degree inclinations for a sloped line rather than "0," "5," and "10" degrees. The latter choice would be hard to draw and hard for the interpretation step to produce a valid raw score.

3. The size of the bubbles should be matched to the number of symbols that fill a bubble, the skill of the person completing the form, the type of paper and marking pencil or pen in use and type of scanning or reading equipment. Typically, multi-level bubbles should not be much smaller than half an inch on a side (12 mm) for human marked forms.

Symbology choices are depicted in the embodiments described below.

Form Design

The ideal bubble choice is one where the user does not have to learn special tools to create the form. Ideally, the bubbles would be characters, or dingbats, available on a computer keyboard. The form would also ideally be created with a word processor as in the case of Remark Office OMR. A symbol key should be provided on the form page showing the user how to fill in the bubbles if the person filling in the form is not trained.

Search

The image produced by a commercial scanner, such as the fi-4340C image scanner sold by Fujitsu Computer Products of San Jose, Calif., typically consists of rows of pixels in a format called Tagged Image File Format (TIFF). The algorithms in state-of-the-art commercial software-based OMR systems, such as Remark Office OMR, are sufficient to locate the bubbles in the image and pass individual thumbnail images or coordinates of the located bubbles to the interpretation step.

Symbology Interpretation

Multi-Level OMR takes the image of the bubble and first isolates the part that a person has filled in with pen or pencil. That is normally done by specifying that any filled in pixels on the interior of the bubble must be human-marked pixel data. The human-marked pixels are converted to a raw score depending on the appropriate algorithm, or combination of algorithms, for recognizing the contents of the bubble corresponding to the symbology expected. Some raw score generating algorithms include:

1. Simple count of the number of filled in pixels divided by the total number of pixels (percentage filled score).

2. Counts of the number of filled in pixels in various regions of the bubble. For example, if the bubble is divided up into four quadrants, count the number of filled in pixels in the upper left, upper right, lower left, and lower right quadrants.

3. Calculating a raw score from a pattern recognition algorithm such as template matching, the Medial axis transform or Karhunen-Loève transform.

4. Heuristic algorithms such as listing any lines drawn in the bubble and outputting a score depending on their orientation.

The correct choice of algorithms is made based on speed and accuracy of the interpretation.

Translation

Translation takes the raw score and looks it up in a table of values to be assigned. For example, the first interpretation algorithm above (percentage filled score), might have an "A" to "D" translation table as follows:

| Percentage of Bubble Filled | Output Value to be Assigned |
| --- | --- |
| 0 to 10% | Not filled |
| 11 to 30% | "A" |
| 31 to 50% | "B" |
| 51% to 70% | "C" |
| 71 and up % | "D" |

The look-up table can be complex and can depend on more than one raw score input. The translation table can be algorithmic, for example, "if the bubble is marked with a vertical bar symbol, output an 'I' if the preceding output was a character and output a '1' if the preceding output was a number."

Invention Embodiments

The following are preferred embodiments of Multi-Level OMR:

1. Six Level Bubbles

FIG. 2 shows a survey processing example. Each bubble is a square, although the bubbles could be in other shapes. The user is presented with a limited variety of ways to fill in the bubbles according to the symbol "key." After a user fills in a bubble with one of the symbols from the key, the second and fourth interpretation algorithms described above are preferably used in conjunction with a translation table such as shown in the following example:

| Bubble Contents (raw score) | Output Value to be Assigned |
| --- | --- |
| No lines, no quadrants filled | Not filled |
| Lower left quadrant filled, left-leaning line (i.e. a "slash") | "strongly disagree" |
| No quadrants filled, left-leaning line | "disagree" |
| No quadrants filled, left and right leaning lines | "neutral" |
| No quadrants filled, right-leaning line | "agree" |
| Lower right quadrant filled, right-leaning line | "strongly agree" |
| All quadrants filled | "no opinion" |
| Anything else | Error |

The bubble contents (raw score) from the pixels in each filled in bubble are translated into one of the limited number of allowed outputs value to be assigned. In the example of FIG. 2, the values range from "strongly disagree" to "strongly agree" and "no opinion." Traditional and Software-Based OMR would require six bubbles for this same survey example and a lot more space on the form. ICR systems need only one bubble per survey but would not be able to read the marked-in areas and output something intelligible with a desirable accuracy since a user is not drawing characters in the bubbles and ICR has hundreds of possible output values to pick between.

The Six Level Bubble may be extended to more levels by allowing users to fill in other quadrants, or to use a vertical bar, horizontal bar, and plus sign ("+"). The quadrants filled would thus be the triangles outlined by the white space around an "X" drawn in the bubble, or the white space around the plus sign as in the Cartesian quadrants as shown in the alternate answer key for FIG. 2.

2. Elongated Bubble Column

Figures 1A, 1B, 1C:
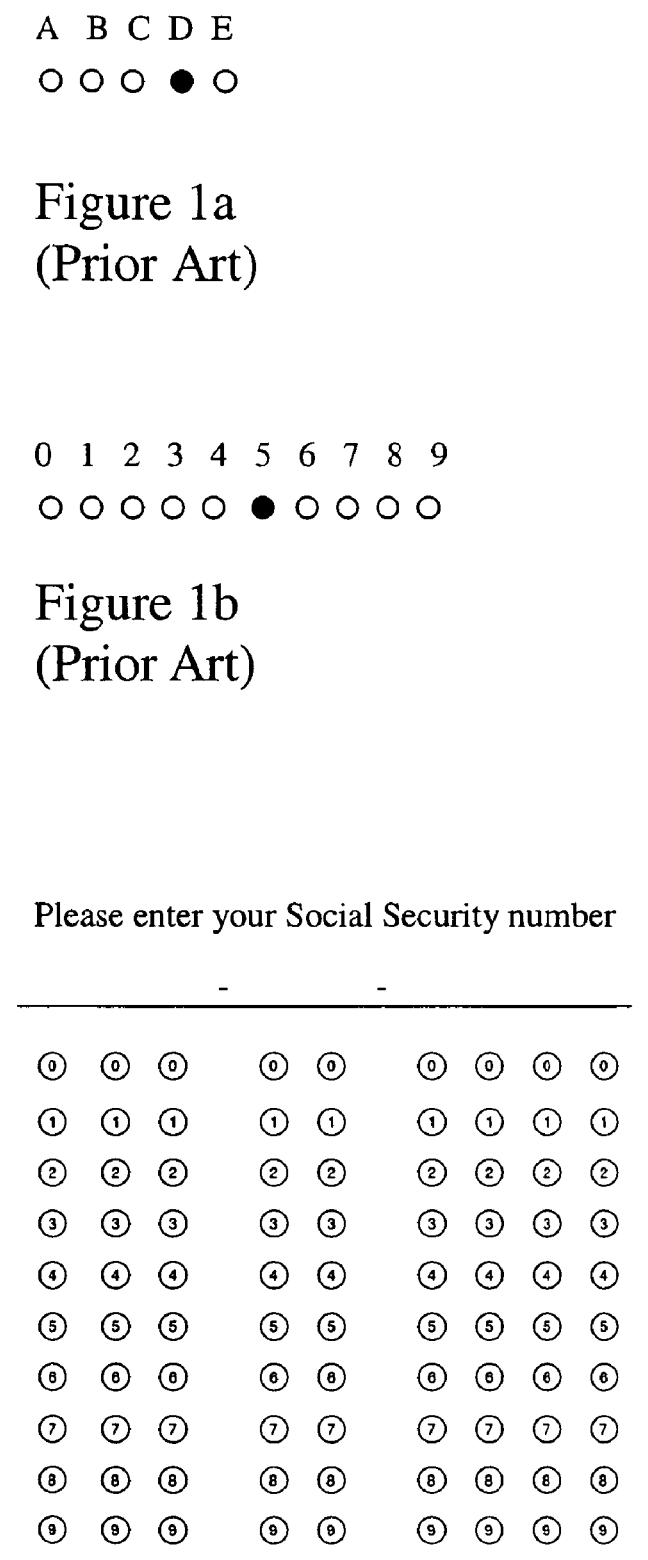

Another embodiment of Multi-Level OMR is shown in FIG. 3. Traditional OMR would use one column of ten bubbles to represent a one digit number ("0" to "9") similar to FIG. 1. Multi-Level OMR replaces the ten bubbles by a single computer-readable elongated bubble column depicted in FIG. 3, thereby resulting in substantial savings in the real estate of the form. The interpretation step involves measuring the length of the line drawn (i.e., the symbol) in the bubble compared with the total elongated bubble length. Specifically, the Multi-Level OMR computer algorithms start at one end of the elongated bubble, the base, and analyze the pixels inside the elongated bubble to determine how much was marked as the raw score. The percentage completed is translated to a desired scale such as "0" to "9" (or "A" to "Z"). The size of the bubble, resolution accuracy of the specific reader device (e.g., image scanner), as well as the accuracy of the individual filling in the bubble determine the upper boundary for how many levels are possible with this bubble design.

FIG. 3 shows three levels, namely, "0," "5," and "9." Ten levels would allow for "0," "1," "2," "3," "4," "5," "6," "7," "8," and "9" to be selectable.

Bubble Density

FIG. 4a and FIG. 4b each show a Multi-Level OMR bubble where the percentage of filled pixels in the bubble is applied to a scale to determine the value. For example, if a bubble has a translation scale of "0" to "9" and the raw score for the bubble indicates it was 63% filled (either all at one end or randomly in the bubble), the 63rd percentile would fall in the sixth scale position causing the bubble to return a value of "6". This embodiment uses a translation table similar to the one shown in the Translation section above.

Position of Line

FIG. 5a through FIG. 5e show Multi-Level OMR bubbles where the position of a line drawn through a bubble determines the bubble value. The interpret step compares the position marked to the bubble's beginning and ending lines to provide a raw score. The raw score is then translated using an appropriate table into the corresponding scale marked on the side of the bubble. For example, an elongated bubble (rectangle) may be divided into n segments where each segment represents one scale position. These segment values may or may not be listed along the bubble. Alternatively, a line drawn through one of the segments (or perhaps all of the segments up to a certain point) determines the bubble's raw score. A series of bubbles of this type may be used to return both numbers and text (e.g., a social security number or a name or an alphanumeric part number).

Bubble Angle

FIG. 6a and FIG. 6b show a bubble where the user draws a line between the center of the circle and an edge to indicate their input. The image processing algorithms then measure the inclination angle of the line to provide the raw score. The raw score is then translated into an output value. For example, in FIG. 4b, the angle measured is 45 degrees and the translation table is one-to-one so the output is "45". Although FIG. 6a and FIG. 6b show the bubble as being a circle, the bubble can also be an arc of a predetermined degree, less than 360 degrees wherein the angle on the arc is used to determine response value.

Relative Line Position

FIG. 7 shows a bubble with scales on both sides. The raw score of a bubble is determined by the computer algorithms following a line from one side of the bubble to the other where each side of the bubble represents distinct scales similar to the "position of line" embodiment described above. The ending value (determined by the position of the line on the "ending" side of the bubble) is subtracted (or alternatively added) from the starting value (determined by the position of the line on the "starting" side of the bubble) to give the raw value score (in two steps). In exemplary FIG. 7, the translation scale of 0-9 is applied to both the starting (left) and the ending (right) sides of the bubble. A line drawn from a starting value of 2 to an ending value of 0 represents the bubble value of (2−0)=2. A line drawn from a starting value of 4 to an ending value of 2 also represents a bubble value of 2, (4−2)=2.

Line Sequence

Combining relevant parts of selected embodiments described above, a single bubble may represent n values by drawing a line from a sequence number to its corresponding value within a scale on the opposite side of the bubble. For example, a 10 digit number may be represented by drawing 10 lines; one line for each cell on one side of the bubble. The value of sequence position 5 is represented by the position of the line drawn from sequence 5 to its corresponding value (within the defined scale). For the example in FIG. 8, the four digit number "1582" is shown.

Adding Line Values

The value of a bubble may also be determined by adding (or subtracting, or applying another arithmetic function) the start value of one or more lines with their ending values. Start and end values are determined by the line position within the appropriate scale. A single bubble may have n number of translation scales applied to it. The bubble's return value is determined by concatenating the value of each line or by adding all the line values together. For example, the raw scores from FIG. 9 may be translated to represent a plurality of digits, such as the digits 7, 3 and 9 (in no particular order), or a single value "19" (calculated by adding 7+3+9).

Center to Edge (or Just Edge)

Figure 10:
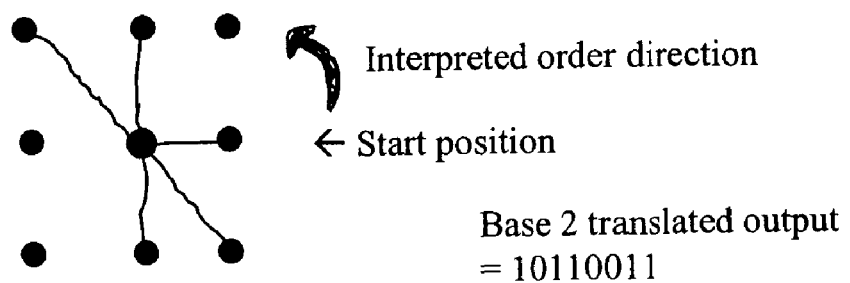

The raw score of a bubble may also be determined by drawing a line between the center of the mark and an outside edge, like the Bubble Angle embodiment, but multiple lines are allowed and are significant for sequencing. The point at which the line intersects the outside edge corresponds to a particular translation scale, like the digits of a binary number shown in FIG. 10. The lines can also be made by the user filling in the bubble by just drawing a line through the outside edge without intersecting the center of the bubble (i.e., one point on the edge directly to another).

Bubble Areas

The total area within a bubble may be divided into segments or subsections which are interpreted independently. The combined bubble raw score value is determined by darkening the appropriate subsections within the bubble. Each subsection affects the translated output value. FIG. 11a shows an example where 10 bubble areas represent the 10 digits ("0" to "9"). Some of the bubble areas may be designated as "scaling" bubbles to represent an added amount or a multiplier (e.g., 2, 3, 4, 5, etc. or 0.1, 10, 100, etc.). If more than one multiplier is darkened, then the multiplier values themselves are multiplied and the darkened digit(s) is scaled based on the resultant multiplier. Alternatively, some of the bubble areas may be designated as "added amount" bubble areas (e.g., +25%, +50%, etc. or +5, +10, etc.)

FIG. 11b is a variation of FIG. 11a where traditional OMR bubbles are run together and interpreted as one complex bubble.

Overlapping Bubbles (Shapes)

The raw score of a series of overlapping (or intersecting) bubble subsections are determined by applying a different score to each subsection. More specifically, the response bubble is a response region defined by a plurality of closed plane figures (e.g., circles or ovals), wherein at least some of the closed plane figures overlap with each other. The translated output value of each overlapping section then becomes the sum, product, or other combination of the overlapping bubbles. Also, the translated output value is determined by applying an equation (e.g., adding or multiplying) the values of all filled sections. In FIG. 12, the area in which the bubbles with a raw score value of 2 and 3 respectively overlap is filled. The translated output value may be the sum of those two values, (2+3)=5. If additional areas were filled, then those values may also be added to the total.

Disregard Scale

As shown in FIG. 13, each of the above examples may also optionally include a "disregard" translation scale item where, if selected, the bubble value would be disregarded (i.e., not calculated). A disregard scale item applied to a traditional bubble (two states: filled/unfilled) would add a third state: disregard. For example, referring to FIG. 16, an empty bubble would be considered unfilled, a bubble with an "X" through it would be considered filled, and a bubble that is totally filled would be disregarded. The disregard setting is simply an optional translation scale item. For example, referring to FIGS. 17a and 17b and FIGS. 18a and 18b, a bubble or series of bubbles may have the following scale applied to it: "Unfilled," "0," "1," "2," "3," "4," "5," "6," "7,", "8," "9," and "Disregard" (12 possible states). One area where this embodiment could be useful is to allow the user to represent a mistake that should be ignored. That is, when using non-erasable pen to fill out a form, the disregard state means that this bubble should be skipped. Depending upon the nature of the data, the next (or another) bubble in sequence is used to take this bubble's place in the final result.

Invert the Marking Process

Each of the above examples may also be implemented using an "inverted marking" approach. In this technique, instead of the user marking the item they mean to represent, the user "unmark" the items they do not want to represent. More specifically, as an example, a form is printed using erasable black ink. The user then erases the ink, or punches a hole, and leaves only the marking information that represented their answer. Similarly, instead of using an eraser or punch, a special color or other overlay "coating" is used to unmark all the options that were not to be selected. As an alternate embodiment, all of the bubbles are scratched out or darkened, except the bubble or bubbles that the user wanted to represent.

In an additional alternate embodiment, an assumption can be made in translation that "all bubbles are selected except for those that are marked". For example, a question might read "Which of the following items do not apply?" and the possible answers might be "1," "2," "3," "4," and "5." If the respondent fills in "2" and "5," then the bubble value would be translated to be "1," "3," and "4."

Combination Schemes

Multiple bubble styles may be combined to produce multiple raw scores and more complex translation tables.

Figure 14A:
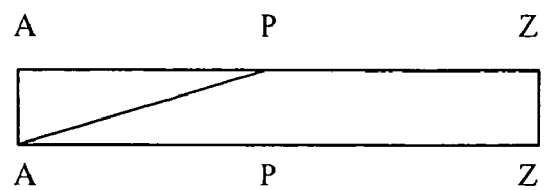
Figure 14B:
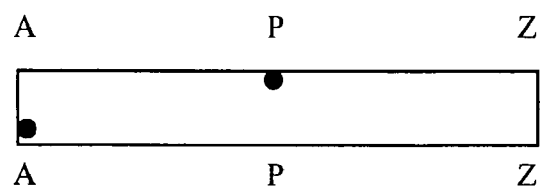
Figure 14C:
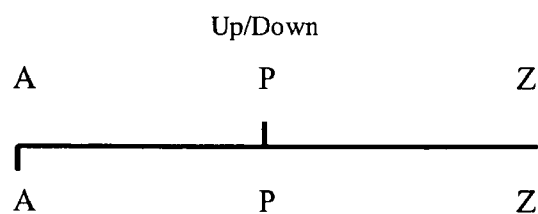

For example, FIGS. 14a, 14b, and 14c depict embodiments that use a relative scale where what is recorded on either side of the bubble is interpreted as a different output. In the example illustrated, a single bubble captures two letters or numbers, as in the abbreviation of a state. These embodiments make use of the Elongated Bubble Column and the Position of Line embodiments.

Figure 15:
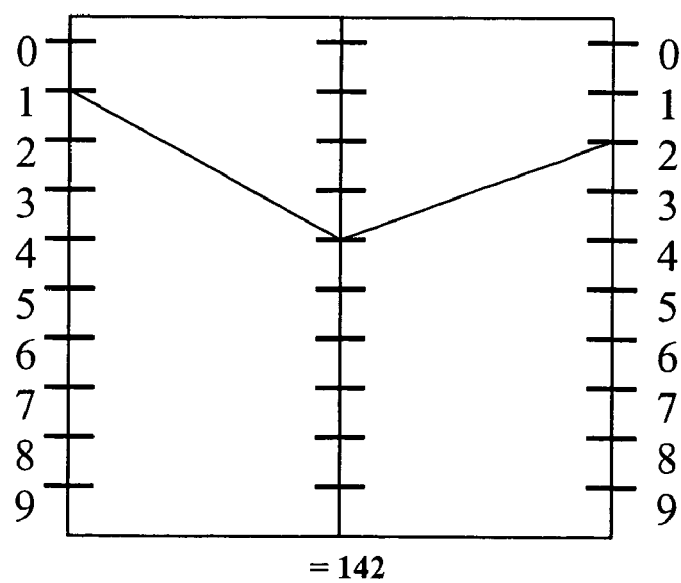
Figure 17A:
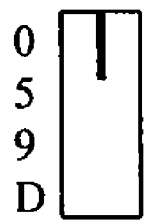
Figure 17B:
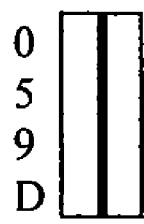

FIG. 15 depicts entering a multiple digit number in a multi-part bubble. This embodiment makes primary use of the Elongated Bubble Column and the Relative Line Position embodiments.

Additional Considerations

A response bubble as described herein can also be considered to be a response region, and vice-versa. A response bubble need not necessarily have a clearly defined outline, such as in the embodiment shown in FIG. 4a and FIG. 4b. For example, the embodiments shown in FIG. 5e, FIG. 10 and FIG. 14c have response regions, but do not have explicitly defined outlines.

In one preferred embodiment, the forms are scanned by a scanning system that uses an optical mark reader. However, in other embodiments, the scanning system may be an image scanner or camera in a computer that runs software to control the image scanner or camera and to interpret/translate the symbology.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of using at least one response bubble on a scannable form to be read by a scanning system, the method comprising:
    (a) defining an unambiguous symbology of non-alphanumeric marks to fill into each response bubble, thereby allowing at least one of a plurality of different non-empty intended responses having different output values to be entered into each response bubble, wherein one of the output values represents a disregard state;
    (b) providing at least one response bubble on the scannable form to be filled in according to the defined symbology of unambiguous marks; and
    (c) scanning a filled in form with the scanning system and processing an image of the scanned form to:
        (i) identify pixels associated with each response bubble,
        (ii) interpret the pixels associated with each response bubble to define a raw score according to the defined unambiguous symbology of marks used to mark each response bubble,
        (iii) translate the raw score for each response bubble into one of the plurality of different non-empty intended responses, and
        (iv) output the value of the non-empty intended response for each response bubble, wherein the different output values have different meanings, and wherein the output value of the non-empty intended response for each response bubble is determined solely from the marks filled into the response bubble.

2. The method of claim 1 wherein each response bubble has three potential states, including a filled state, an unfilled state and the disregard state, wherein the filled state and the disregard state are the plurality of different non-empty intended responses, and the unfilled state is an empty response bubble.

3. The method of claim 2 wherein each of the states have different output values.

* * * * *